United States Patent [19]
Nagase et al.

[11] Patent Number: 5,305,167
[45] Date of Patent: Apr. 19, 1994

[54] MAGNETIC DISK APPARATUS HAVING MAGNETIC HEAD INSULATED FROM METAL HEAD CARRIAGE

[75] Inventors: Fumio Nagase, Tama; Jiro Ueki, Fuchu, both of Japan

[73] Assignee: TEAC Corporation, Tokyo, Japan

[21] Appl. No.: 780,033

[22] Filed: Oct. 21, 1991

[30] Foreign Application Priority Data

Oct. 22, 1990 [JP] Japan .................... 2-110398[U]

[51] Int. Cl.$^5$ .................................... G11B 15/48
[52] U.S. Cl. ........................ 360/104; 360/103
[58] Field of Search ................... 360/104, 103

[56] References Cited

U.S. PATENT DOCUMENTS

| | | | |
|---|---|---|---|
| 4,306,258 | 12/1981 | Higashiyama et al. | 360/104 |
| 4,633,352 | 12/1986 | Mizoguchi | 360/104 |
| 4,819,094 | 4/1989 | Oberg | 360/104 |
| 5,107,383 | 4/1992 | Takeuchi et al. | 360/104 |
| 5,115,363 | 5/1992 | Khan et al. | 360/104 |
| 5,124,864 | 6/1992 | Matsuzaki | 360/104 |

Primary Examiner—Edward P. Westin
Assistant Examiner—Andrew Sanders
Attorney, Agent, or Firm—Michael N. Meller

[57] ABSTRACT

The present inventor provides a magnetic disk apparatus that has a moving unit, a magnetic head and a wiring plate that electrically insulates the magnetic head and the moving unit. The moving unit is configured so as to be movable in a direction substantially parallel to a surface of the magnetic disk. The magnetic head records and/or reproduces signals on and/or from the surface of the magnetic disk supported on a electrically conductive flexible member. The wiring plate is configured from an insulated member sandwiched between the moving unit and the flexible member and a wiring portion that is formed on the flexible member and electrically connected to the magnetic head.

10 Claims, 6 Drawing Sheets

MAGNETIC DISK APPARATUS HAVING MAGNETIC HEAD INSULATED FROM METAL HEAD CARRIAGE

BACKGROUND OF THE INVENTION

The present invention relates to a magnetic disk apparatus that can be thinner than conventional ones, and in particular, relates to a magnetic disk apparatus having a magnetic head that is insulated from a metal head carriage.

Magnetic disk apparatus use a magnetic head to perform magnetic recording and reproduction on and from a magnetic disk, while a magnetic head carriage that supports the magnetic head is moved in the direction of the radius of a magnetic disk. A flexible wiring plate is connected to the magnetic head. Reproduction signals of the magnetic head are supplied to a reproduction circuit and magnetic head recording signals are supplied from a recording circuit via the flexible wiring plate.

However, there are magnetic disk apparatus of a dual head type where magnetic heads are in contact with both sides of a magnetic disk. In this type of apparatus, the magnetic head on a lower side of the magnetic disc is provided on the carriage unit at a bottom side of the magnetic disk and recording and reproduction is performed on the bottom side of a magnetic disk. This carriage unit moves along a guide shaft in the direction of the radius of the magnetic disk. The magnetic head on an upper side of the magnetic disk is supported by an arm and performs recording and reproduction on the upper side of the magnetic disk. This arm is mounted on the carriage unit so as to be rotationally movable.

The magnetic head is placed on a metal gimbal plate i.e. a plate spring, so as to be in stable contact with the surface of the magnetic disk. In a conventional apparatus, the magnetic head is supported on the carriage via the gimbal plate. Because of this, the carriage unit is formed of an insulating synthetic resin so that the noise from the side of a base of the apparatus has no influence on the magnetic head.

However, with the recent need to manufacture thinner magnetic disk apparatus, research is also being performed into the manufacture of thinner carriages. However, mechanical strength decreases if the carriage is simply made thinner. In order to prevent this lowering of the mechanical strength, one solution is to manufacture a thin carriage unit from aluminum or some other metal.

When the carriage unit is made of metal and a gimbal plate is directly placed on the carriage unit, the potential of the magnetic head that is supported on this gimbal plate becomes the same potential as a base of the apparatus via the gimbal plate, the metal carriage unit, and a lead screw and other parts. Therefore, it is easy for the magnetic head to be influenced by noise from the side of the apparatus that passes through the base of the apparatus.

Because of this, a plate shaped insulating member is placed on the carriage that is conventionally made of metal, and the gimbal plate is provided on top of this insulating member. In this manner, the insulating member is provided between the gimbal plate and the metal carriage unit and the configuration is such that there is insulation between the metal carriage unit and the magnetic head that is mounted on the gimbal plate. By this means, it is possible to prevent the magnetic head from being influenced by noise from the base of the apparatus that passes through the metal carriage.

Alternatively, a distal end portion of the metal carriage unit can be covered with an insulated synthetic resin. Then, the provision of a metal gimbal plate on the distal end portion of the carriage unit made of synthetic resin insulates the magnetic head on the gimbal plate from the metal portions of the carriage unit.

However, the provision of an insulating member between the metal carriage unit and the gimbal plate increases the number of parts and also increases the amount of time required for assembly. Also, forming the synthetic resin on the distal end portion of the metal carriage unit not only increases the number of parts, but also results in the need for an additional process for forming the synthetic resin on the distal end portion. Because of this, there is the problem that an increased amount of time is needed for manufacturing and manufacturing costs are increased.

SUMMARY OF THE INVENTION

A general object of the present invention is the provision of a magnetic disk apparatus that has a magnetic head that is insulated from a metal head carriage to thereby solve the problems described above.

Another object of the present invention is to provide a magnetic disk apparatus that has a magnetic head insulated from a metal head carriage, and having a moving unit configured so as to be freely movable in a direction substantially parallel to a magnetic disk surface, the magnetic head recording and/or reproducing signals on and/or from one surface of a magnetic disk supported on a flexible member of an electrically conductive material, and an insulated wiring plate sandwiched between the moving unit and the flexible member that is electrically connected to the magnetic head.

Another object of the present invention is to provide a magnetic disk apparatus that has a magnetic head insulated from a metal head carriage provided with a moving unit that is configured so as to be freely movable in a direction substantially parallel to an magnetic disk surface, a flexible insulation member provided on the moving unit, a magnetic head that records and/or reproduces signals on and/or from one surface of magnetic disk supported on a flexible member formed of an insulating material, and a wiring plate electrically connected to the magnetic head.

According to the present invention, it is possible to obtain a magnetic disk apparatus that has a thin head carriage, without additional manufacturing processes or increased manufacturing costs.

In addition, according to the present invention, the insulating wiring plate is attached to the contact surface of the electrically conductive gimbal plate (flexible member) that contacts the head carriage (moving unit). The magnetic head supported by the gimbal plate is in electrical contact with this wiring plate and the magnetic head is mounted on the gimbal plate. Accordingly, there is no increase in the number of parts over that of the conventional apparatus and it is possible to prevent the transmission of noise from the head carriage to the magnetic head.

The magnetic head is electrically insulated from the head carriage so it is possible to make the head carriage thinner than that of the conventional art while maintaining a sufficient mechanical strength of the head carriage that is made of metal. So, it is also possible to make the apparatus thinner than that of the conventional art.

Accordingly, the apparatus of the present invention has the same number of parts as a conventional apparatus and the work for attaching the wiring plate to the gimbal plate is performed in the conventional manner. Therefore, the present invention involves no additional process and the assembly work is trouble-free.

In addition, if the gimbal plate itself is formed from a member that has the properties of flexibility and insulation, then a favorable insulation between the head carriage and the magnetic head can be obtained and an effect the same as that described above can be obtained.

Other objects and features of the present invention will become apparent from the following detailed description of the present invention, with reference to the appended drawings.

DESCRIPTION OF THE PREFERRED EMBODIMENT

Figure 1:
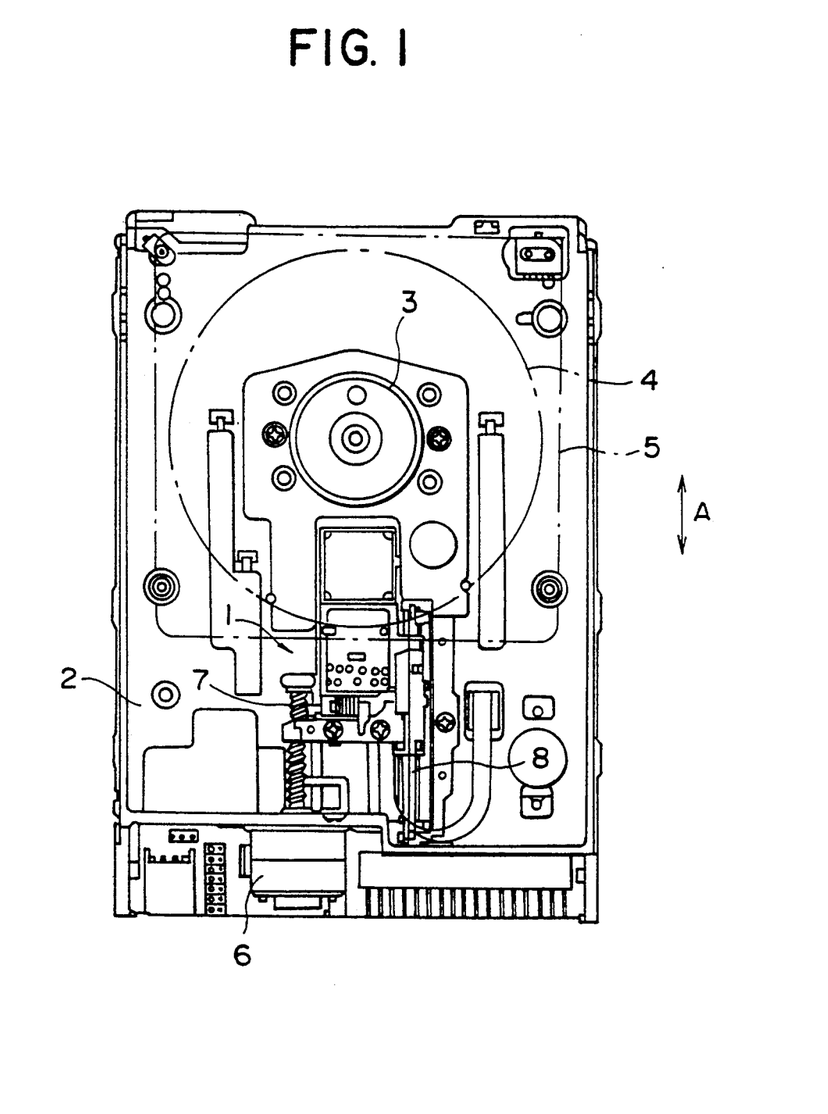
FIG. 1 is a plan view of a magnetic disk apparatus according to the present invention.
Figure 2:
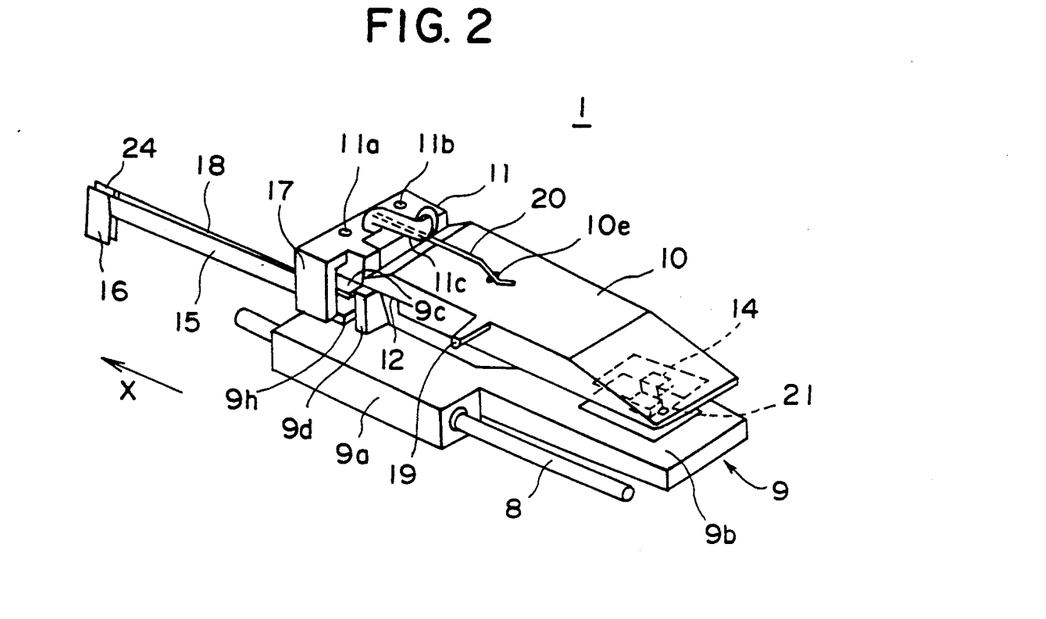
FIG. 2 is a perspective view of a magnetic head carriage.
Figure 3:
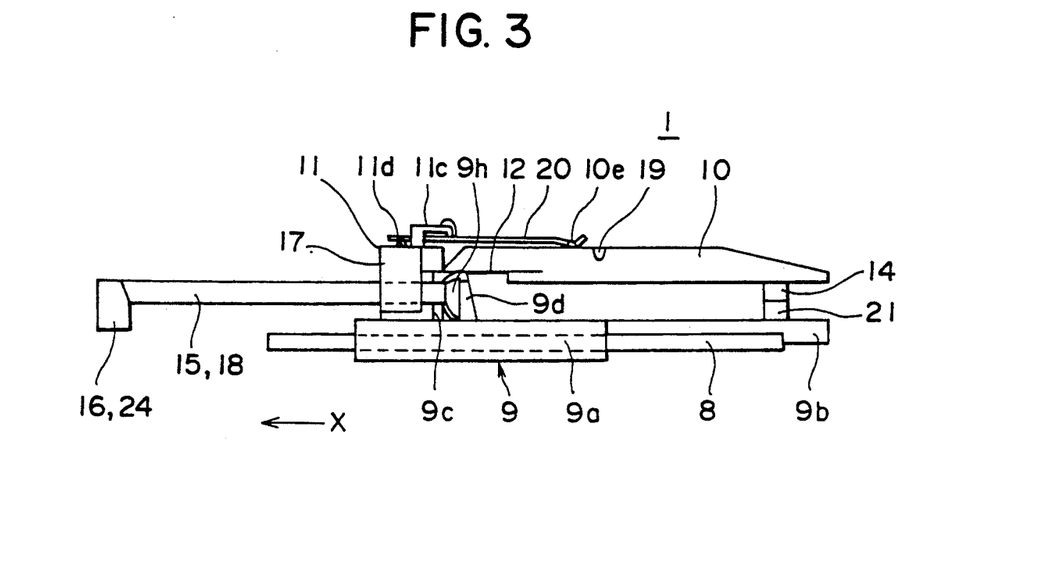
FIG. 3 is an elevational view of the magnetic head carriage.

FIG. 1, FIG. 2 and FIG. 3 show a first embodiment of a magnetic disk apparatus according to the present invention. In each of the figures, a magnetic head carriage 1 of the dual-head type is provided on the magnetic disk apparatus so as to be freely movable in the directions indicated by the arrows A.

As shown in FIG. 1, a turntable 3 is provided so as to protrude on a base 2. When a case 5 (shown by the dotted line) that houses a magnetic disk 4 is then mounted inside the apparatus, the magnetic disk 4 is mounted onto the turntable 3. One portion of the magnetic head carriage 1 engages with a lead screw 7 and the lead screw 7 is driven by a motor 6 so that it rotates.

When the lead screw 7 is driven by the motor 6 and rotates, the magnetic head carriage 1 is guided by a guide shaft 8 and moves in either one radial direction or another radial direction shown by A. Then, magnetic recording and reproduction is performed on a required position of the magnetic disk 4.

As shown in FIG. 2 and FIG. 3, the configuration of the magnetic head carriage 1 includes a carriage unit 9 (moving unit), an arm 10 mounted on the carriage unit 9 so as to be rotatably movable, and a holder 11 that supports the arm 10 on the carriage unit 9.

Figure 4:
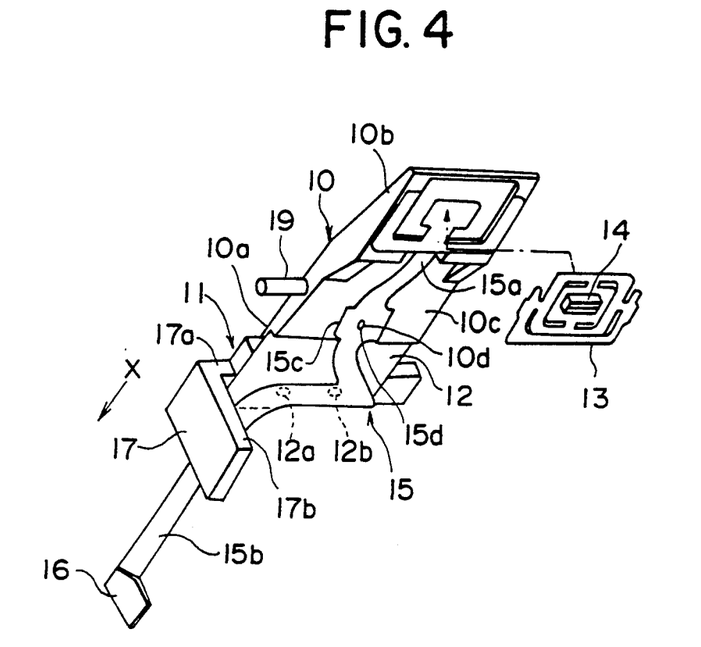
FIG. 4 is a perspective view of an upper-side arm of the apparatus.

As shown in FIG. 4, a plate spring 12 is fixed to the bottom surface of a base end portion 10a of the arm 10, and a gimbal plate 13 is fixed to the lower surface of a distal end portion 10b of the arm 10. Then, a magnetic head 14 of the upper side of the magnetic disc is fixed to the center of the gimbal plate 13.

A flexible wiring plate 15 has an L-shape and its distal end portion 15a is connected to the magnetic head 14. In addition, at the side opposite to the distal end portion 15a a free side 15b is provided, this free side being curved to extend in a direction to the left of the bottom of FIG. 4. A connector 16 is provided at the free side 15b of the flexible wiring plate 15.

A wide-width portion 15c is provided in the vicinity of the center of the flexible wiring plate 15 and a hole 15d is provided in the center of the wide-width portion 15c. On the other hand, a protruding pin 10d is provided so as to protrude from a lower surface 10c of the arm 10 and the protruding pin 10d engages with the hole 15d of the flexible wiring plate 15 so that it prevents displacement with respect to the arm 10 of the flexible wiring plate 15.

Holes 12a,12b (shown by the broken line in FIG. 4) are provided on the plate spring 12. Screws (not shown in the figure) pass through the holes 12a,12b. The holder 11 is in contact with the upper surface of the plate spring 12. The end portion of the plate spring 12 is sandwiched between the lower surface of the holder 11 and the upper surface of the mounting portion 9c of the carriage unit 9. The holder 11 has mounting screw insertion holes 11a,11b (shown in FIG. 2). The mounting screws (not shown in the figure) are inserted into the holes 12a,12b via from the upper portion of the holder 11 and via the mounting screw insertion holes 11a,11b, and support the plate spring 12. In addition, a support portion 17 is monolithically provided at the surface of the left side of the holder 11, so as to protrude from the holder 11 in a reversed L-shape.

The configuration of the support portion 17 includes an arm portion 17a that protrudes to the side from the holder 11 and a vertical portion 17b that extends in the direction away from the arm portion 17a. Moreover, the vertical portion 17b of the support portion 17 is in contact with and supports a flexible wiring plate 23 to be described later (not shown in the FIG. 4) and the flexible wiring plate 15 so that the free end portion 15b of the flexible wiring plate 15 and the flexible wiring plate 23 on the side of the carriage main unit 9 can extend rearward as shown by the arrow X in the FIG. 4. The free side 15b of the flexible wiring plate 15 extends from the lower surface 10c of the arm 10, in the direction of the holder 11.

A hook 19 protrudes from the side of the arm 10. When the magnetic disk 4 is ejected from the apparatus and the magnetic head 14 is separated from the magnetic head 21, the disk holder (not shown in the figure) contacts the lower portion of the hook 19 and the hook 19 is pressed in the upwards direction in the figure, so that the plate spring 12 bends and the arm 10 rotates in the upwards direction.

As shown in FIG. 2 and FIG. 3, a torsion spring 20 is supported by the support portion 11c that protrudes from the upper portion of the holder 11. One end of the torsion spring 20 is fixed by the stopper portion 11d on the holder 11, and the other end is fixed by a stopper portion 10e provided on the upper surface of the arm 10. The torsion spring 20 presses the arm 10 in the downward direction.

Figure 5:
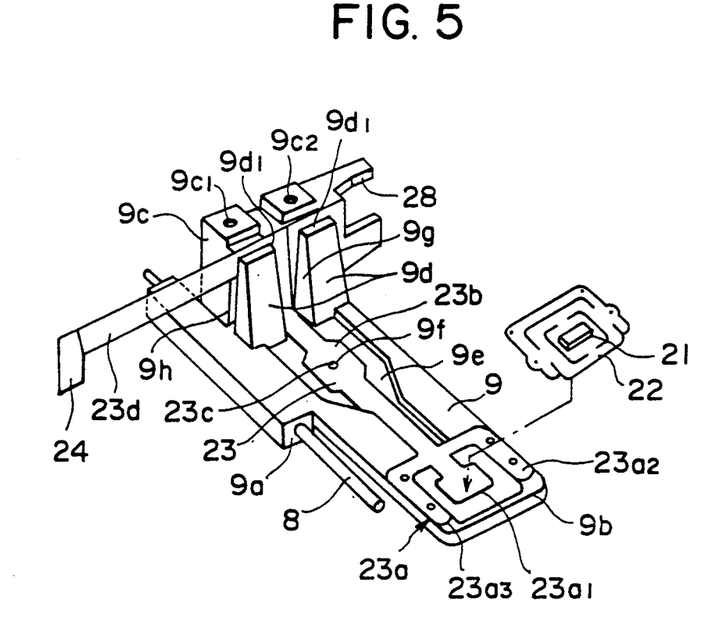
FIG. 5 is a perspective view of a carriage main unit in a first embodiment of a magnetic disk apparatus according to the present invention.

The carriage unit 9 is formed from a metal such as aluminum or the like, so that it can be made thinner. As shown in FIG. 5, the carriage unit 9 is configured with a bearing portion 9a, a mounting portion 9b, a fixed portion 9c, a pair of supports 9d and a recessed portion 9e. The guide shaft 8 passes freely through the bearing portion 9a.

A gimbal plate 22 upon which the magnetic head 21 of the lower side is mounted, is attached to the mounting portion 9b. The plate spring 12 fixed on the arm 10 is supported on the fixed portion 9c. The pair of supports 9d support the plate spring 12. The recessed portion 9e is provided so as to extend between the mounting portion 9b at the front of the carriage unit 9 and the fixed portion 9c at the rear of the carriage unit 9.

Threaded 9c1, 9c2 are provided on the upper surface of the fixed portion 9c of the carriage unit 9 so as to fix the holder 11. An engagement portion 28 engages with the lead screw 7 (not shown in the figure) and protrudes from the right side of the fixed portion 9c. A triangular shaped protruding portion 9d1 is provided on the upper surface of the support 9d. The triangular shaped protruding portion 9d1 is in contact with the lower surface of the plate spring 12 (not shown in the figure). The plate spring 12 can bend with the protruding portion 9d1 acting as the pivot.

Figure 6:
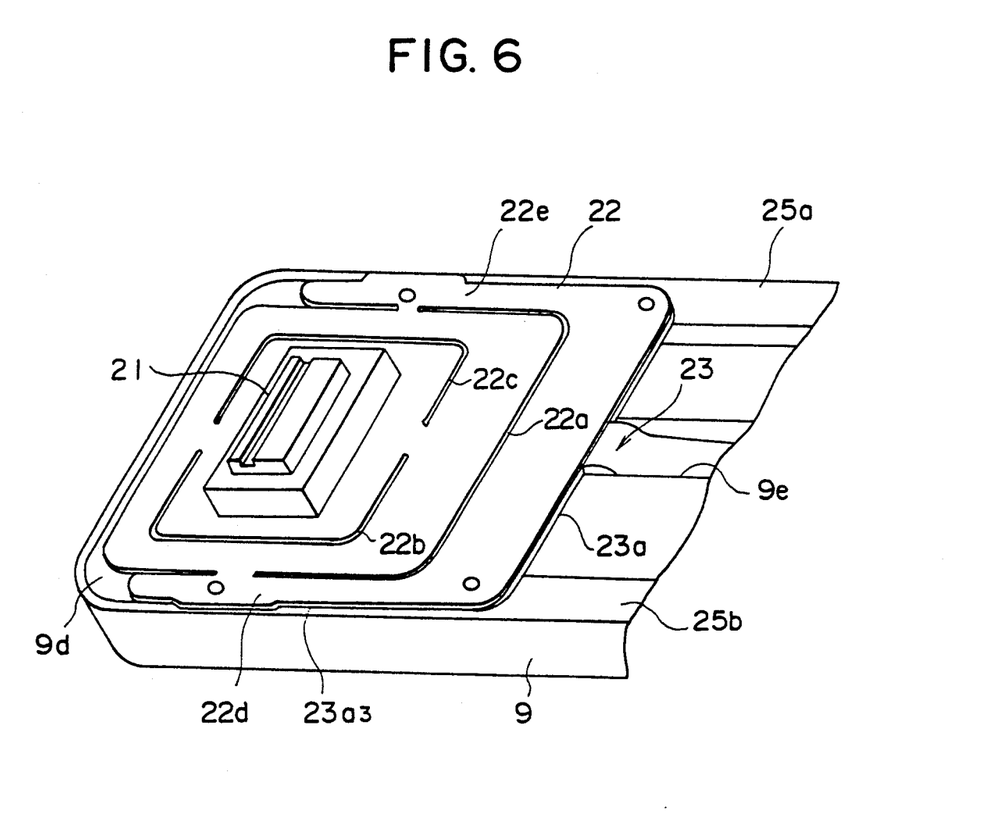
FIG. 6 is an enlarged perspective view showing the status of mounting of a gimbal plate.

As shown in FIG. 6, the gimbal plate 22 is configured from a thin metal plate. The magnetic head 21 of the lower side of the magnetic disk (not shown in the FIG. 6) is mounted in the center of the gimbal plate 22. C-shaped grooves 22a,22b,22c are provided in the gimbal plate 22 so that the magnetic head 21 on the lower side of the magnetic disk can rotate in two intersecting directions.

The flexible wiring plate 23 is covered with a metallic conductor material on the outside that is configured from an insulating material such as polyamide film or polyester film or the like, and is formed so that it can be deformed by the application of external force. The flexible wiring plate 23 is provided so as to be fixed to the lower surface of the gimbal plate 22. One portion of the flexible wiring plate 23 is mounted inside the recessed portion 9e of the carriage unit 9. A distal end portion 23a of the flexible wiring plate 23 is provided between the carriage unit 9 and the gimbal plate 22, and is electrically connected to the magnetic head 21 of the lower side of the magnetic disk.

Figure 7:
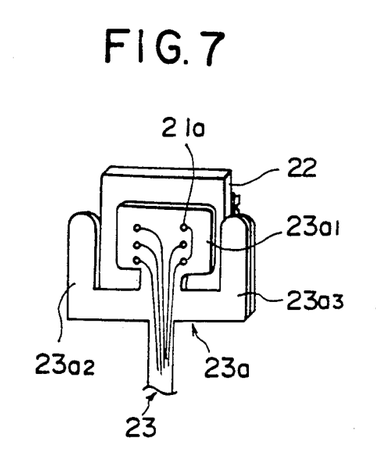
FIG. 7 is a perspective view showing the status of mounting of a flexible wiring plate.
Figure 8:
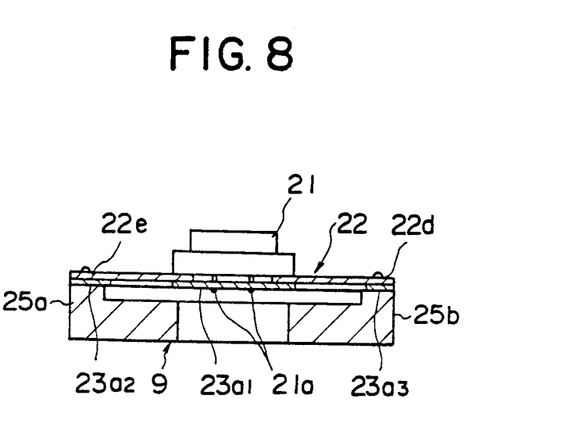
FIG. 8 is a longitudinal sectional view showing the status of mounting of the flexible wiring plate.

As shown in FIG. 7 and FIG. 8, the distal end portion 23a of the flexible wiring plate 23 is configured from a connector portion 23a1, and arm portions 23a2 and 23a3. A terminal 21a of the magnetic head 21 of the lower side is electrically connected to the connector portion 23a1. By this means, reproduction signals of the magnetic head 21 of the lower side of the magnetic disk are supplied to the reproduction circuit and recording signals from the recording circuit are supplied to the magnetic head 21 of the lower side of the magnetic disk via the flexible wiring plate 23, and information is recorded and reproduced on and from the magnetic disk.

The arm portions 23a2 and 23a3 of the flexible wiring plate 23 are formed in an L-shape and extend along both sides of the connector portion 23a1. The arm portions 23a2 and 23a3 are formed so as to be in contact with the lower surface end portion of the gimbal plate 22.

In FIG. 8, the contact portions 22d,22e of the gimbal plate 22 would be in direct contact with edge portions 25a, 25b of the metal carriage unit 9 if the arm portions 23a2 and 23a3 were not provided. However, in the present embodiment, there is the flexible wiring plate 23 between the gimbal plate 22 and the carriage unit 9. The arm portions 23a2 and 23a3 of the flexible wiring plate 23 are provided on the edge portions 25a,25b formed so as to protrude from both end portions of the carriage unit 9. The contact portions 22d,22e on the lower surface of the gimbal plate 22 are provided on the arm portions 23a2 and 23a3.

As has been described, the flexible wiring plate 23 has an outer covering of an insulating material and so the gimbal plate 22 and the edge portions 25a,25b on which the gimbal plate 22 are mounted, are insulated by the arm portions 23a2 and 23a3. Because of this, side of the base (the base 2 in FIG. 1) is not transmitted to the gimbal plate 22 via the metal carriage unit 9. Accordingly, it is possible to prevent the transmission of noise to the magnetic head 21 of the lower side of the magnetic disk which is mounted on the gimbal plate 22, without the provision of an insulating member in addition to the flexible wiring plate 23.

In addition, as shown in FIG. 5, the flexible wiring plate 23 has a wide-width portion 23b that is provided inside the recessed portion 9e of the carriage unit 9. A hole 23c is provided in this wide-width portion 23b. The protruding pin 9f that protrudes from the recessed portion 9e engages with this hole 23c. A space 9g is provided between the pair of supports 9d,9d and a gap 9h is provided between the support 9d and the fixed portion 9c. The flexible wiring plate 23 extends to the side of the carriage unit 9 via the space 9g and the gap 9h. A connector 24 connects to a free side 23d of the flexible wiring plate 23.

In addition, the distal end portion 23a of the flexible wiring plate 23 is fixed and assembled by adhesive to the lower surface of the gimbal plate 22 and so the assembly work is facilitated. The flexible wiring plate 23 is assembled by the conventional method (but the arm portions 23a2,23a3 are not conventionally provided on the distal end portion 23a of the flexible wiring plate 23) and so there is no increase in the work involved in the assembly of the present embodiment, and the number of processes is the same as in the conventional method. In addition, according to the present embodiment, there is no increase in the number of parts and so there is no rise in the manufacturing costs, and there is no inconvenience involved in the assembly work.

In this manner, supporting the gimbal plate 22 by the metal carriage unit 9 and via the arm portions 23a2,23a3 of the flexible wiring plate 23 that is insulating enables electrical insulation to be present between the magnetic head 21 and the carriage unit 9. Accordingly, it is possible for the carriage unit 9 to be made from metal and be thin yet still have sufficient mechanical strength, so that as a result, it is possible for the unit 9 to contribute to the making of thinner magnetic disk apparatus.

Figure 9:
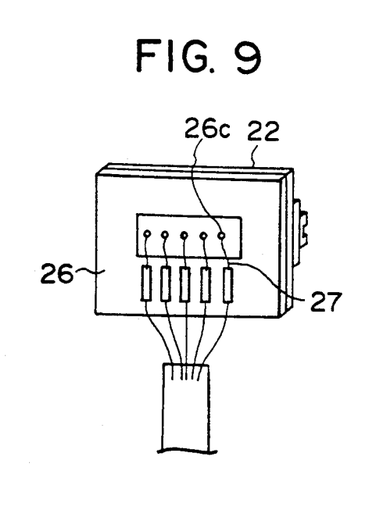
FIG. 9 is a perspective view showing the status of mounting of a printed circuit board in a second embodiment of a magnetic disk apparatus according to the present invention.
Figure 10:
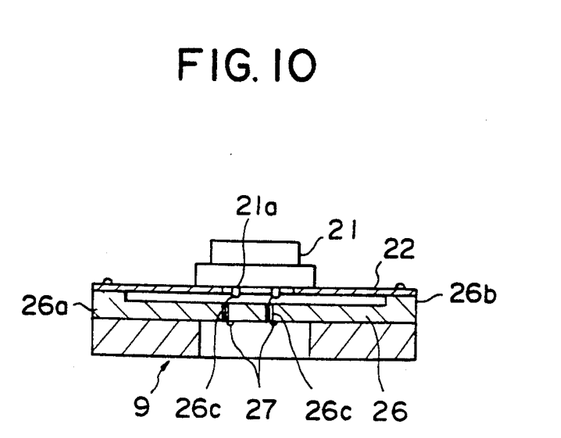
FIG. 10 is a longitudinal sectional view of the printed circuit board of FIG. 9.

FIG. 9 and FIG. 10 show a second embodiment of the present invention. In each of the figures, there is a printed circuit board 26 provided on the bottom surface of the gimbal plate 22. The printed circuit board 26 is rigid and so the entire gimbal plate 22 does not bend along with the printed circuit board 26 to which it is attached. Because of this, support portions 26a,26b are provided so as to protrude from both sides of the upper surface of the printed circuit board 26 so that the printed circuit board 26 does not obstruct the operation of the gimbal plate 22, and raises the gimbal plate 22 and supports it.

In addition, the terminal 21a of the magnetic head 21 of the lower side of the magnetic disk is connected to the printed circuit board 26 via a jumper line 27. The jumper line 27 passes through a through hole 26c provided in the center of the printed circuit board 26.

The printed circuit board 26 of an insulating material is between the gimbal plate 22 and the carriage unit 9 and therefore insulates the carriage unit 9 and the gimbal plate 22 from each other. Accordingly, noise from the base of the lower side of the carriage unit is prevented from being transmitted to the magnetic head 21 of the lower side of the magnetic disk via the metal carriage unit 9.

Figure 11:
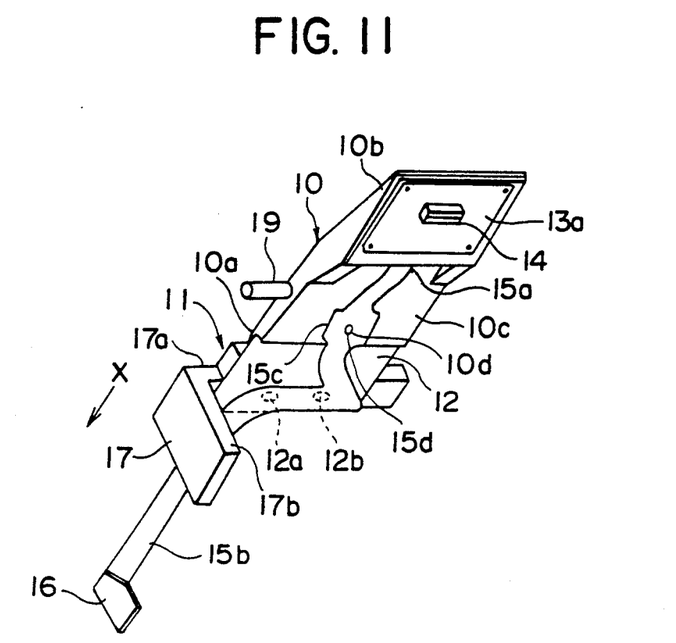
FIG. 11 is a perspective view of the upper side arm of the apparatus in a third embodiment of a magnetic disk apparatus according to the present invention.
Figure 12:
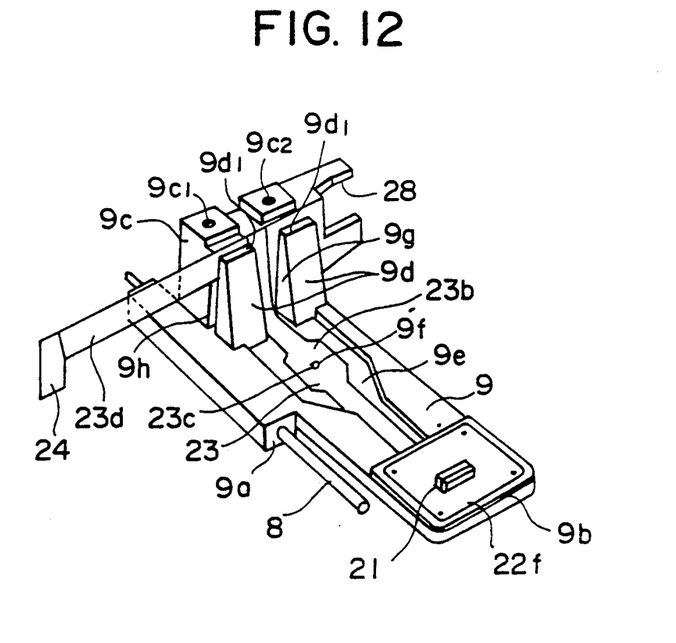
FIG. 12 is a perspective view of a carriage main unit in a third embodiment of a magnetic disk apparatus according to the present invention.

FIG. 11 and FIG. 12 show a third embodiment of the present invention. In each of the figures, the gimbal plates 13a,22f are formed of liquid crystal plastic (LCP) that has both flexibility and an insulating property. The liquid crystal plastic gimbal plates 13a,22f are formed in flat plate shapes and the magnetic heads 14,21 are mounted in their centers. The magnetic heads 14,21 are supported by the gimbal plates 13a, 22f that flexibly deform.

In addition, so as to further support the magnetic heads 14,21 flexibly, the same grooves can be formed in the gimbal plates 13a,22f as those in the metal gimbal plates.

In this embodiment, the gimbal plates 13a,22f formed from an insulating material are mounted on the mounting portion 9b of the carriage unit 9 . Accordingly, the transmission of noise from the side of the apparatus base 2 via the carriage unit 9 to the magnetic heads 14,21 mounted in the centers of the gimbal plates 13a,22f, is prevented.

What is claimed is:

1. A magnetic disk apparatus having an electrically conductive moving unit configured so as to be freely movable in a direction substantially parallel to a magnetic disk surface, a magnetic head that records and/or reproduces signals on and/or from one surface of said magnetic disk supported on an electrically conductive flexible member, and a wiring plate configured from a wiring portion formed on said flexible member and electrically connected to said magnetic head and an insulated member sandwiched between said moving unit and said flexible member.

2. The magnetic disk apparatus according to claim 1, wherein said flexible member is a metal gimbal plate.

3. The magnetic disk apparatus according to claim 1, wherein said moving unit has a support portion formed so as to protrude into an end portion of said moving unit, and said wiring portion has an L-shaped arm portion that is sandwiched between said support portion and said flexible member formed at one end of said wiring plate.

4. The magnetic disk apparatus according to claim 1, wherein said wiring plate is formed so as to be flexibly bendable.

5. The magnetic disk apparatus according to claim 1, additionally provided with
an electrically conductive rotating member provided on said moving unit so as to be freely rotatable,
an insulating wiring plate provided on said electrically conductive flexible member for recording and/or reproducing signals on and/or from another surface of said magnetic disk,
another wiring plate configured from another wiring portion formed on said other flexible member and electrically connected to said other magnetic head and another insulated member sandwiched between said rotating member and said other flexible member.

6. A magnetic disk apparatus having an electrically conductive moving unit configured so as to be freely movable in a direction substantially parallel to a magnetic disk surface,
an insulating flexible member provided on said moving unit,
a magnetic head that records and/or reproduces signals on and/or from one surface of said magnetic disk supported on said insulating flexible member, and
an insulating wiring plate provided with a wiring portion electrically connected to said magnetic head.

7. The magnetic disk apparatus according to claim 6, wherein
said insulating flexible member is comprised of liquid crystal plastic.

8. The magnetic disk apparatus according to claim 6, wherein
said insulating flexible member is comprised of gimbal plates of liquid crystal plastic.

9. The magnetic disk apparatus according to claim 6, wherein
said wiring plate is formed so as to be flexibly bendable.

10. The magnetic disk apparatus according to claim 6, additionally provided with
an electrically conductive rotating member provided on said moving unit so as to be freely rotatable,
another insulating flexible member provided on said rotating member,
another magnetic head supported on said other insulating flexible member for recording and/or reproducing signals on and/or from another surface of said magnetic disk, and
another insulating wiring plate provided with another wiring portion electrically connected to said other magnetic head.

* * * * *